P. SHARKEY.
Cultivator.
No. 23,788.  Patented Apr. 26, 1859.
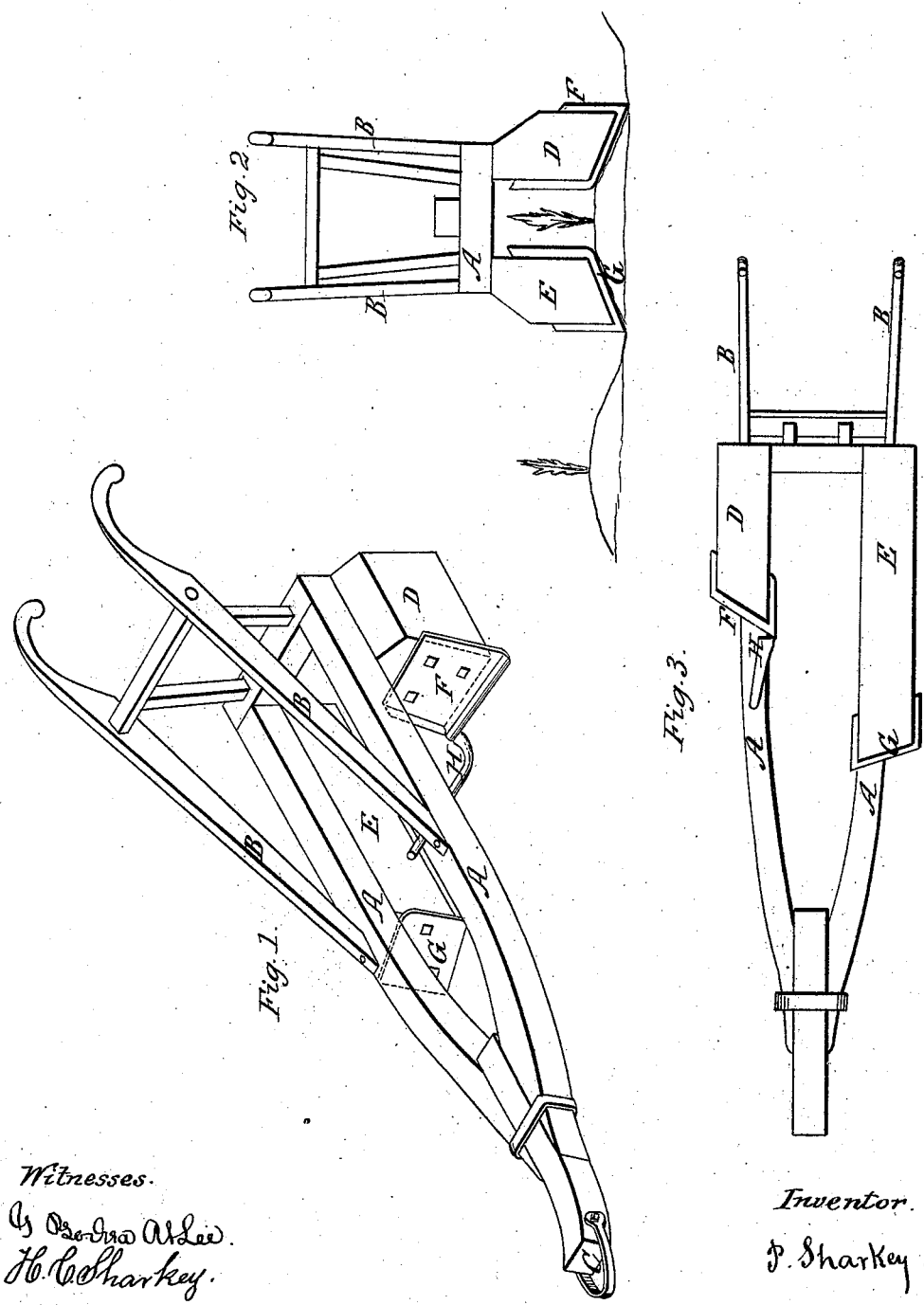

UNITED STATES PATENT OFFICE.

PATRICK SHARKEY, OF BROWNSVILLE, MISSISSIPPI.

IMPROVEMENT IN COTTON-SCRAPERS.

Specification forming part of Letters Patent No. 23,788, dated April 26, 1859.

*To all whom it may concern:*

Be it known that I, PATRICK SHARKEY, of Brownsville, in the county of Hinds and State of Mississippi, have invented a new and useful Improvement in Cotton-Scrapers; and I do hereby declare that the following is a full, clear, and exact description of the same, reference being had to the accompanying drawings, forming a part of this specification, in which—

Figure 1 is a perspective view of my improved cotton-scraper. Fig. 2 is a rear view of the same. Fig. 3 is an inverted plan of the same.

Similar letters of reference in each of the several figures indicate corresponding parts.

My invention consists in arranging the scrapers, one forward of the other, on guide-blocks or runners of different different lengths in such a manner that the scraper of the short runner shall always have a tendency to move with the scraper of the long runner without offering any resistance to the movement in a right direction of the same, this result being due to the fact that the long runner extends half its length forward of the front end of the short runner, and consequently acting as a governor to said short runner so long as it (the long runner) is properly guided by the operator.

My invention consists, second, in the arrangement of a sleigh-runner-shaped gage with the short scraper, in the manner hereinafter specified.

To enable others skilled in the art to make and use my invention, I will proceed to describe its construction and operation.

A represents the frame of the cultivator. This frame may consist of two beams, arranged so that when united at their forward and rear ends a figure somewhat similar to a V shall be formed.

B B are the handles, arranged as shown or in any other more suitable manner. C is the draft-hook.

D E represent two guide-blocks or runners, on which the scrapers F G are arranged. These blocks may be beveled on their bottom surface to give the proper inclination to the cotton ridge, as shown in Fig. 2. They are also beveled on their forward ends, as shown in Fig. 3, so as to give the scrapers F G the proper oblique set to throw the soil and weeds from toward the cotton.

The runner or guide D is generally and preferably made only half as long as the runner E, so that it shall be controlled by and made to have a tendency to move with the runner E, instead of being allowed to act with an equal force against it, as is the case when, as now practiced, two runners of equal length and with two scrapers arranged on the same transverse line are employed, instead of two runners of unequal length with the scrapers arranged on a line drawn diagonally from one to the other, as in my arrangement.

It will readily be understood that, as the long runner presents a greater amount of surface to the ground, it will, so long as it is guided straight by the operator, be caused to pull the short runner, which presents only half the resistance to the ground, toward it, and thus all chance of lateral deflection or turning out of the proper straight course avoided.

It will also be seen that there is no chance for the machine to choke by weeds wedging in between its runners, as the weeds escape round the inner front edge of the long runner and have no contact with the short rear runner; and at the same time the trash and weeds cut up by the scraper of the short runner are escaping round the inner front edge of the short runner.

H is a sleigh-runner gage, placed in front of the short scraper. This gage prevents the scraper entering too deep into the soil in case of its being caused to "dip" by any obstruction.

What I claim as my invention, and desire to secure by Letters Patent, is—

1. Arranging the scrapers F G, one forward of the other, on guide-blocks or runners D E of different lengths, substantially as and for the purposes set forth.

2. The arrangement of a sleigh-runner-shaped gage with the short scraper F, substantially as and for the purposes set forth.

P. SHARKEY.

Witnesses:
G. YORKE AT LEE,
H. C. SHARKEY.